(12) United States Patent
Toyama

(10) Patent No.: US 6,392,815 B2
(45) Date of Patent: May 21, 2002

(54) SMALL-SIZED, LARGE-APERTURE, WIDE-ANGLE ZOOM LENS

(75) Inventor: Nobuaki Toyama, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/766,574

(22) Filed: Jan. 23, 2001

(30) Foreign Application Priority Data

Mar. 16, 2000 (JP) .................................... 2000-073435

(51) Int. Cl.[7] ................................................ G02B 15/14
(52) U.S. Cl. ......................... 359/680; 359/689; 359/740
(58) Field of Search ................................ 359/689, 676, 359/680, 691, 740, 784

(56) References Cited

U.S. PATENT DOCUMENTS

| | | | | |
|---|---|---|---|---|
| 4,168,110 A | * | 9/1979 | Itoh | 359/680 |
| 4,647,160 A | * | 3/1987 | Ikemori | 359/680 |
| 4,726,665 A | * | 2/1988 | Itoh | 359/681 |
| 4,810,072 A | * | 3/1989 | Takahashi | 359/689 |
| 4,838,666 A | | 6/1989 | Shiraishi | 359/689 |
| 4,844,599 A | * | 7/1989 | Ito | 359/680 |
| 5,035,492 A | * | 7/1991 | Ito | 359/676 |
| 5,073,015 A | * | 12/1991 | Ueda | 359/680 |
| 5,078,481 A | * | 1/1992 | Nakayama et al. | 359/676 |
| 5,255,123 A | * | 10/1993 | Estelle | 359/676 |
| 5,550,679 A | | 8/1996 | Sugawara | 359/689 |
| 5,899,585 A | * | 5/1999 | Ogawa | 359/689 |
| 5,909,318 A | * | 6/1999 | Tanaka | 359/687 |
| 5,914,820 A | * | 6/1999 | Takimoto et al. | 359/686 |
| 5,991,091 A | * | 11/1999 | Hayakawa | 359/557 |
| 6,008,951 A | * | 12/1999 | Anderson | 359/677 |
| 6,124,984 A | * | 9/2000 | Shibayama et al. | 359/689 |
| 6,304,389 B1 | * | 10/2001 | Shibayama | 359/676 |
| 6,308,011 B1 | * | 10/2001 | Wachi et al. | 359/689 |
| 6,327,098 B1 | * | 12/2001 | Sensui | 359/680 |

FOREIGN PATENT DOCUMENTS

| | | | | |
|---|---|---|---|---|
| JP | 2-203314 A | * | 8/1990 | 359/689 |
| JP | 2556048 | | 9/1996 | |

* cited by examiner

Primary Examiner—Evelyn A Lester
(74) Attorney, Agent, or Firm—Arnold International; Bruce Y. Arnold

(57) ABSTRACT

A small-sized, large-aperture, wide-angle zoom lens, having three lens groups of negative, positive, and positive refractive power, respectively, in order from the object side, is disclosed. The $F_{NO}$ of the zoom lens remains constant during zooming. The second lens group includes, in order from the object side, a biconvex lens element, a negative lens element having a concave surface on the object side, a positive lens element having a convex surface on the image side, and a biconvex lens element. The first and second lens groups are moved along the optical axis during zooming, and the third lens group is fixed in position during zooming and includes a stop. Specified conditions are preferably satisfied in order to keep the focal length of the zoom lens short, to correct aberrations, and to keep manufacturing of the zoom lens practicable. Thus, bright, well-corrected images are obtained over the entire range of zoom.

16 Claims, 4 Drawing Sheets

Spherical Aberration (mm)

Astigmatism (mm)

Distortion

Spherical Aberration (mm)

Astigmatism (mm)

Distortion

Spherical
Aberration (mm)

Astigmatism (mm)

Distortion

Spherical
Aberration (mm)

Astigmatism (mm)

Distortion

SMALL-SIZED, LARGE-APERTURE, WIDE-ANGLE ZOOM LENS

BACKGROUND OF THE INVENTION

To date, many different types of small-sized, large-aperture, wide-angle zoom lenses that are used in video cameras and electronic still cameras, such as digital cameras, have been proposed. Among them, for instance, one described in Japanese Patent Publication No. 2556048 is known that has a relatively light-weight front lens element and yields a bright image. The $F_{NO}$ is in the range 1.0–1.7 and the zoom lens is formed of, in order from the object side, a first lens group having a negative refractive power, a second lens group having a positive refractive power, and a third lens group having a positive refractive power. This zoom lens has some problems, however, in that the $F_{NO}$ changes during zooming and the image angle at the wide-angle end is rather small.

BRIEF SUMMARY OF THE INVENTION

The objects of the present invention are to provide a small-sized, large-aperture, wide-angle zoom lens in which the $F_{NO}$ remains constant during zooming, and which ensures a wider image angle at the wide-angle end. Further, it is desired that the zoom lens satisfactorily correct aberrations over the entire range of zoom so as to provide bright images of high quality throughout the range of zoom. More specifically, the present invention aims to provide a small-sized, large-aperture wide-angle zoom lens having an $F_{NO}$ of approximately 1.4 with the $F_{NO}$ remaining constant during zooming, an image angle that is approximately 110 degrees, and a zoom ratio of about 2.6.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
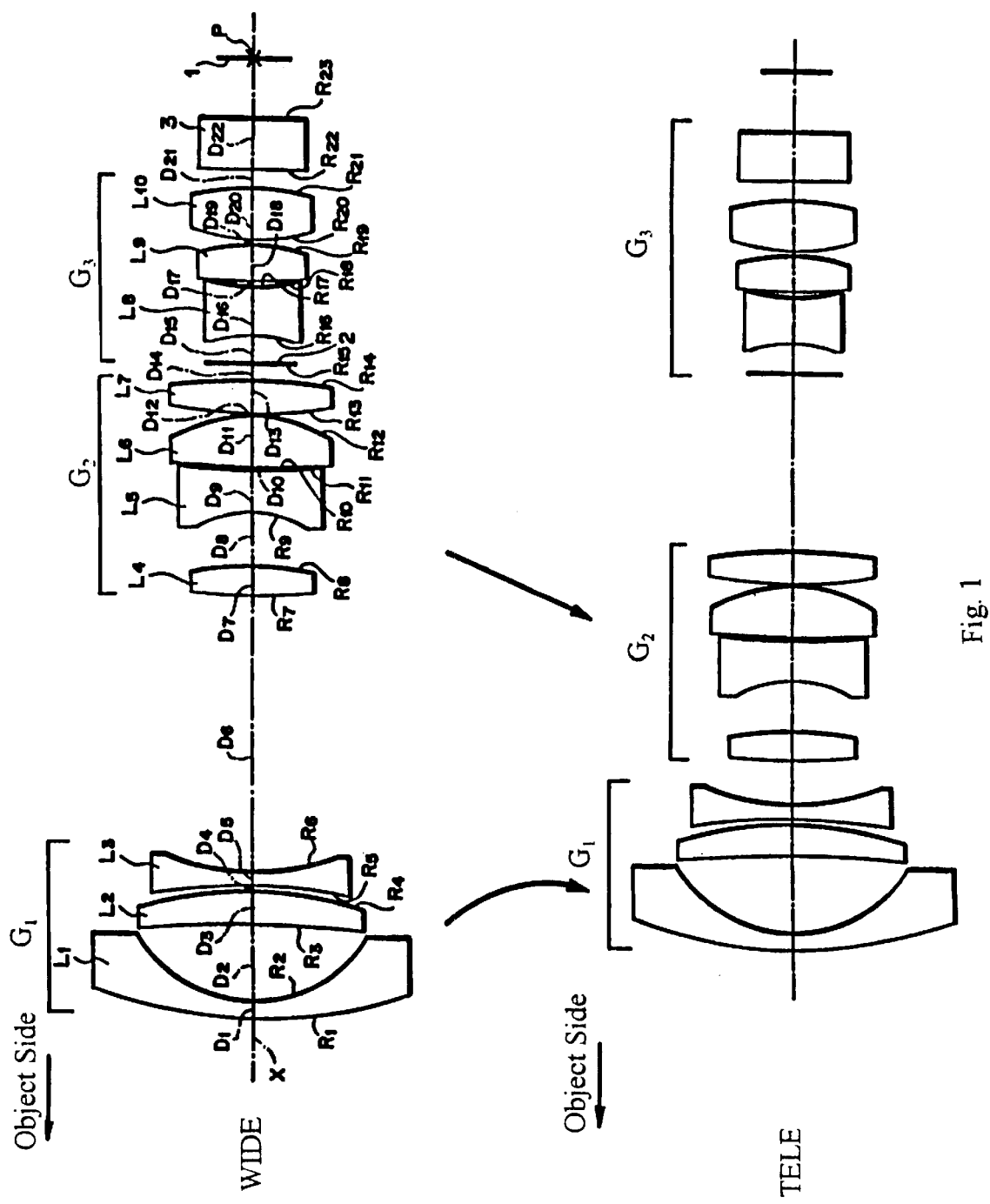
FIG. 1 is a schematic view showing the basic lens element configuration of Embodiment 1 of the present invention, as well as the lens group positions at both the wide-angle end (WIDE) and telephoto end (TELE)

The present invention relates to a zoom lens that is especially suited for use in a video camera or a digital camera that uses a small-sized detector array (such as a CCD array) to record images. Such cameras require a zoom lens that provides a wide image angle, has a large aperture, and yet has a short focal length.

The zoom lens of the present invention is formed of, in order from the object side, a first lens group having negative refractive power, a second lens group having positive refractive power, and a third lens group having positive refractive power. The first and second lens groups are moved along the optical axis during zooming in order to change the magnification. The third lens group is fixed relative to the image plane and includes a stop.

The first lens group preferably is formed of, in order from the object side, a negative meniscus lens element having its convex surface on the object side, a positive lens element having a convex surface on the image side, and a negative lens element having a concave surface on the image side.

The second lens group is formed of, in order from the object side, a biconvex lens element, a negative lens element having a concave surface on the object side, a positive lens element having a convex surface on the image side, and a biconvex lens element.

The third lens group preferably is formed of, in order from the object side, a biconcave lens element, a biconvex lens element, and a biconvex lens element.

In addition, it is preferred that the following Condition (1) is satisfied:

$$5.5 < D_{2G}/f_W < 7.5 \qquad \text{Condition (1)}$$

where $D_{2G}$ is the spacing between those surfaces of the second lens group that are nearest the object side and the image side (i.e., the sum of D7 through D13); and $f_W$ is the focal length of the zoom lens at the wide-angle end.

It is also preferred that the following Condition (2) is satisfied:

$$3.5 < R_2/f_W < 4.7 \qquad \text{Condition (2)}$$

where $R_2$ is the radius of curvature of the second lens surface, in order from the object side, and $f_W$ is the focal length of the zoom lens at the wide-angle end.

Condition (1) defines the permitted range, of the ratio of the thickness $D_{2G}$ of the second lens group divided by the focal length $f_W$ of the zoom lens at the wide-angle end, in order to satisfactorily correct coma aberration and curvature of field and also to keep the overall length of the zoom lens small. When the upper limit of Condition (1) is not satisfied, coma will become excessive and be difficult to correct, and the overall length of the zoom lens will prevent the zoom lens from being compact. When the lower limit of Condition (1) is not satisfied, coma and field curvature will become excessive and be difficult to correct.

Condition (2) defines the permitted range, of the ratio of the radius of curvature $R_2$ of second surface from the object side divided by the focal length $f_W$, of the zoom lens at the wide-angle end, in order to satisfactorily correct coma and curvature of field, and also to keep manufacture and assembly of the zoom lens practicable. When the upper limit of Condition (2) is not satisfied, coma will become excessive and be difficult to correct. When the lower limit of Condition (2) is not satisfied, manufacture and assembly of the zoom lens will become difficult and will hamper production of the zoom lens.

Various embodiments of the invention will now be discussed in detail. In each embodiment, the numbers given are standardized to provide nearly the same focal length zoom lens at the wide-angle end.

Embodiment 1

FIG. 1 is a schematic view showing the basic lens element configuration and lens group spacings of the zoom lens of Embodiment 1 at both the wide-angle and telephoto ends. The zoom lens of Embodiment 1 is formed of, in order from the object side, a first lens group $G_1$ having negative refractive power, a second lens group $G_2$ having positive refractive power, and a third lens group $G_3$ having positive refractive power. A stop is positioned on the object side of the third lens group. During zooming, the third lens group is fixed relative to the image plane and the first and second lens groups are moved along the optical axis X in order to change the focal length f of the zoom lens while forming an image centered at image point P on the image plane 1.

The first lens group $G_1$ is formed of, in order from the object side, a first lens element $L_1$ which is a negative meniscus lens with its convex surface on the object side, a second lens element $L_2$ which is a positive meniscus lens with its convex surface on the image side, and a third lens element $L_3$ which is a biconcave lens.

The second lens group $G_2$ is formed of, in order from the object side, a fourth lens element $L_4$ which is a biconvex lens, a fifth lens element $L_5$ which is a biconcave lens, a sixth lens element $L_6$ which is a biconvex lens, and a seventh lens element $L_7$ which is a biconvex lens.

The third lens group $G_3$ is formed of, in order from the object side, an eighth lens element $L_8$ which is a biconcave lens, a ninth lens element $L_9$ which is a biconvex lens, and a tenth lens element $L_{10}$ which is a biconvex lens. A filter 3 is positioned on the image side of the third lens group $G_3$. The zoom lens of Embodiment 1 satisfies the above Conditions (1) and (2).

Table 1 lists the surface number #, in order from the object side, the radius of curvature R (in mm) of each surface, the on-axis spacing D (in mm) between surfaces, as well as the refractive index $N_d$ and the Abbe number $v_d$ (both at the d line) of each lens element of Embodiment 1. The middle portion of Table 1 lists the values of D6 and D14 for the wide-angle end (WIDE) and telephoto end (TELE). The bottom portion of Table 1 lists the range of focal lengths (i.e., from the wide-angle end to telephoto end), the F number $F_{NO}$, the value $(D_{2G}/f_W)$ of Condition (1) and the value $(R_2/f_W)$ of Condition (2). As is apparent from comparing these values to the above two conditions, both Condition (1) and Condition (2) are satisfied by this embodiment.

TABLE 1

| # | R | D | $N_d$ | $v_d$ |
|---|---|---|---|---|
| 1 | 31.217 | 1.20 | 1.75500 | 52.3 |
| 2 | 8.961 | 5.02 | | |
| 3 | −68.721 | 2.21 | 1.84665 | 23.8 |
| 4 | −24.311 | 0.30 | | |
| 5 | −37.946 | 0.90 | 1.80400 | 46.6 |
| 6 | 15.135 | D6 (variable) | | |
| 7 | 43.209 | 2.12 | 1.84665 | 23.8 |
| 8 | −17.642 | 3.52 | | |
| 9 | −7.732 | 2.85 | 1.80517 | 25.4 |
| 10 | 63.527 | 0.06 | | |
| 11 | 89.568 | 3.57 | 1.71299 | 53.8 |
| 12 | −9.899 | 0.10 | | |
| 13 | 32.611 | 2.31 | 1.71299 | 53.8 |
| 14 | −32.611 | D14 (variable) | | |
| 15 | ∞ (stop) | 2.00 | | |
| 16 | −8.194 | 3.16 | 1.78472 | 25.7 |
| 17 | 12.179 | 0.41 | | |
| 18 | 35.410 | 2.43 | 1.80400 | 46.6 |
| 19 | −11.632 | 0.22 | | |
| 20 | 11.904 | 3.41 | 1.71299 | 53.8 |
| 21 | −15.771 | 1.00 | | |
| 22 | ∞ | 3.30 | 1.51633 | 64.1 |
| 23 | ∞ | | | |

| | WIDE | TELE |
|---|---|---|
| D6 | 19.14 | 3.09 |
| D14 | 1.00 | 11.88 |

$f = 2.27–5.91$    $F_{NO} = 1.45$    $D_{2G}/f_W = 6.40$    $R_2/f_W = 3.95$

Figure 2A:
FIGS. 2A–2C show the spherical aberration, astigmatism in both the sagittal S and tangential T image planes, and distortion, respectively, of Embodiment 1 at the wide-angle end.
Figure 2B:
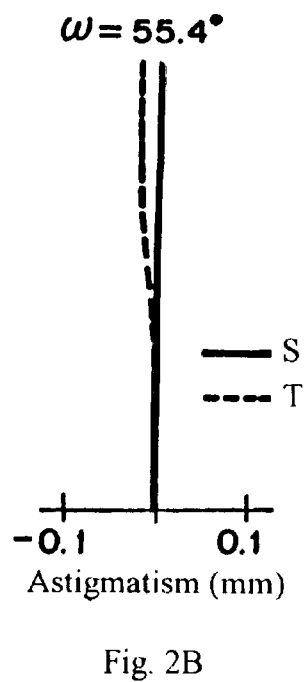
Figure 2C:
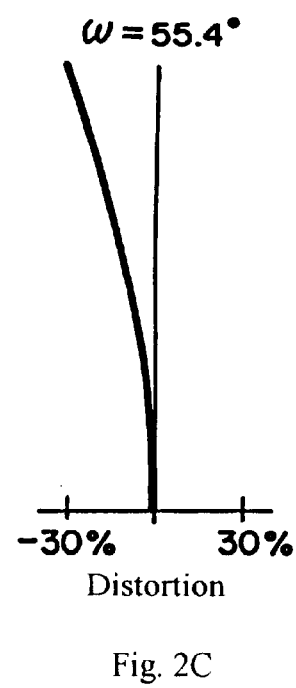
Figure 2D:
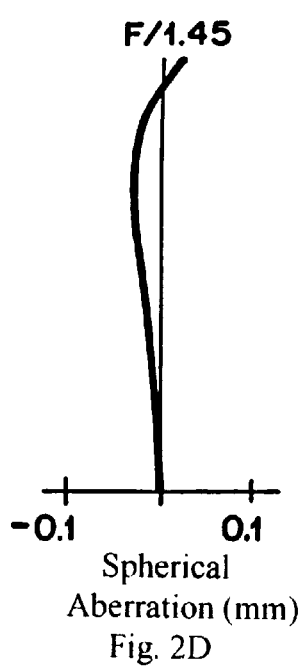
FIGS. 2D–2F show the spherical aberration, astigmatism in both the sagittal S and tangential T image planes, and distortion, respectively, of Embodiment 1 at the telephoto end.
Figure 2E:
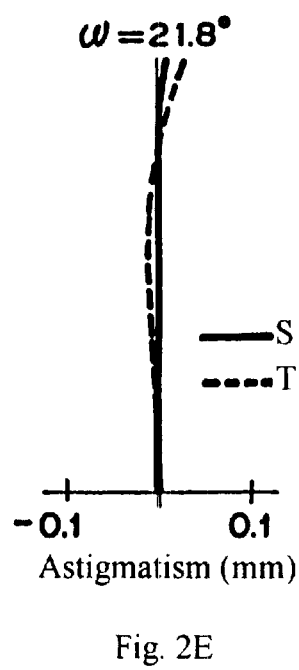
Figure 2F:
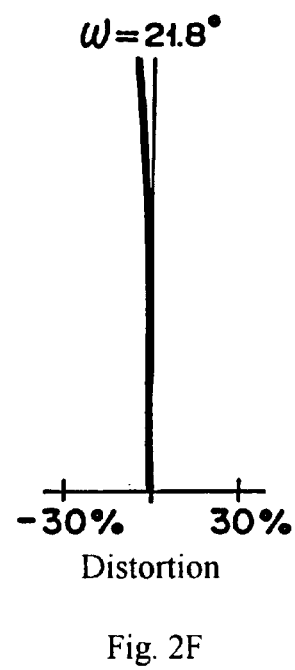

FIGS. 2A–2C show the spherical aberration, astigmatism, and distortion, respectively, of the zoom tens of Embodiment 1 at the wide-angle end. FIGS. 2D–2F show the spherical aberration, astigmatism, and distortion, respectively, of the zoom lens of Embodiment 1 at the telephoto end. The astigmatic curves are shown for both the sagittal S and tangential T image planes. As is apparent from these figures, these aberrations are favorably corrected for this embodiment over the entire range of zoom.

Embodiment 2

The zoom lens of Embodiment 2 has nearly the same structure as of Embodiment 1 except that, in this embodiment, the sixth lens element $L_6$ is a positive meniscus lens with its convex surface on the image side.

Table 2 lists the surface number #, in order from the object side, the radius of curvature R (in mm) of each surface, the on-axis spacing D (in mm) between surfaces, as well as the refractive index $N_d$ and the Abbe number $v_d$ (both at the d line) of each lens element of Embodiment 2. The middle portion of Table 2 lists the values D6 and D14 at both the wide-angle end (WIDE) and telephoto end (TELE). The bottom portion of Table 2 lists the range of focal length (i.e., from the wide-angle end to telephoto end), the F number $F_{NO}$, the value $D_{2G}/f_W$ of Condition (1) and the value $R_2/f_W$ of Condition (2). As is apparent from comparing these values to the above two conditions, both Condition (1) and Condition (2) are satisfied by this embodiment.

TABLE 2

| # | R | D | $N_d$ | $v_d$ |
|---|---|---|---|---|
| 1 | 46.385 | 1.00 | 1.75500 | 52.3 |
| 2 | 9.683 | 4.56 | | |
| 3 | −117.053 | 2.00 | 1.84665 | 23.8 |
| 4 | −25.081 | 0.10 | | |
| 5 | −46.003 | 1.00 | 1.80400 | 46.6 |
| 6 | 15.553 | D6 | | |
| 7 | 39.437 | 1.97 | 1.84665 | 23.8 |
| 8 | −17.400 | 3.43 | | |
| 9 | −7.425 | 2.45 | 1.76182 | 26.5 |
| 10 | 19.514 | 0.75 | | |
| 11 | −57.725 | 2.05 | 1.62041 | 60.3 |
| 12 | −10.850 | 0.10 | | |
| 13 | 29.236 | 3.10 | 1.71299 | 53.8 |
| 14 | −11.459 | D14 | | |
| 15 | ∞ (stop) | 2.00 | | |

TABLE 2-continued

| # | R | D | $N_d$ | $v_d$ |
|---|---|---|---|---|
| 16 | −8.410 | 4.90 | 1.80517 | 25.4 |
| 17 | 17.927 | 0.16 | | |
| 18 | 29.364 | 1.97 | 1.80400 | 46.6 |
| 19 | −11.492 | 0.10 | | |
| 20 | 11.398 | 1.92 | 1.75500 | 52.3 |
| 21 | −43.821 | 1.00 | | |
| 22 | ∞ | 3.76 | 1.51633 | 64.1 |
| 23 | ∞ | | | |

| | WIDE | TELE |
|---|---|---|
| D6 | 18.29 | 2.00 |
| D14 | 1.00 | 11.88 | f = 2.28–5.81   $F_{NO}$ = 1.45   $D_{2G}/f_W$ = 6.03   $R_2/f_W$ = 4.25

Figure 3A:
FIGS. 3A–3C show the spherical aberration, astigmatism in both the sagittal S and tangential T image planes, and distortion, respectively, of Embodiment 2 at the wide-angle end.
Figure 3B:
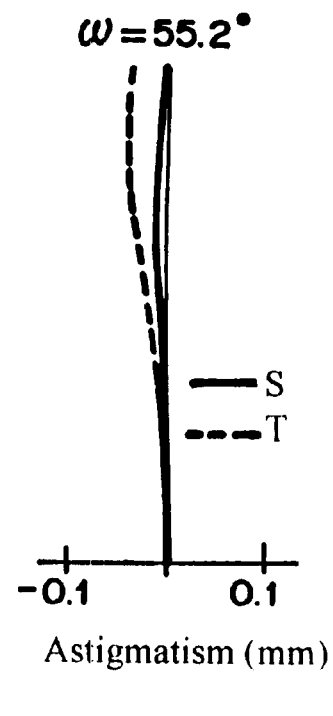
Figure 3C:
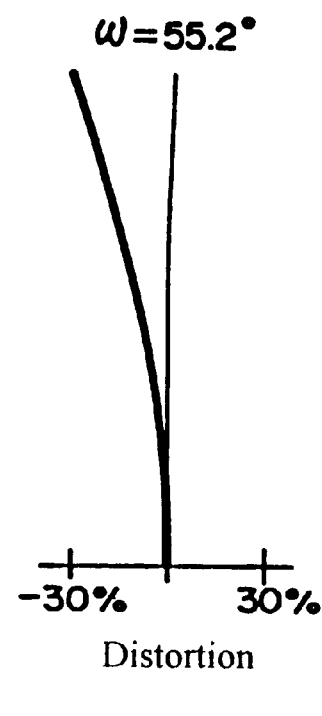
Figure 3D:
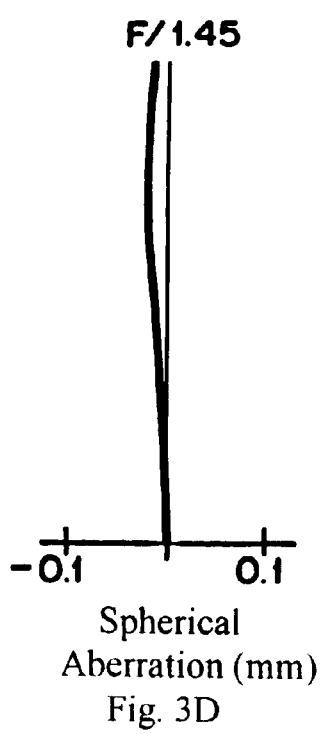
FIGS. 3D–3F show the spherical aberration, astigmatism in both the sagittal S and tangential T image planes, and distortion, respectively, of Embodiment 2 at the telephoto end.
Figure 3E:
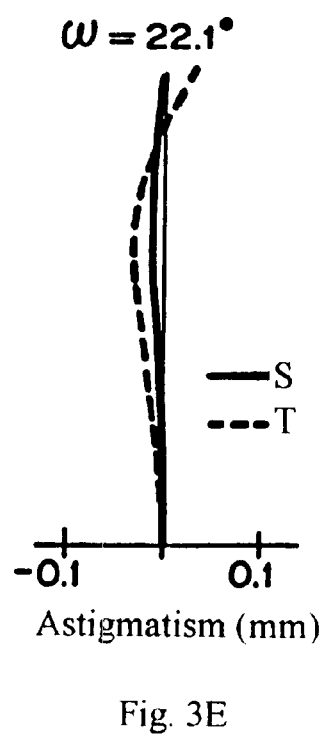
Figure 3F:
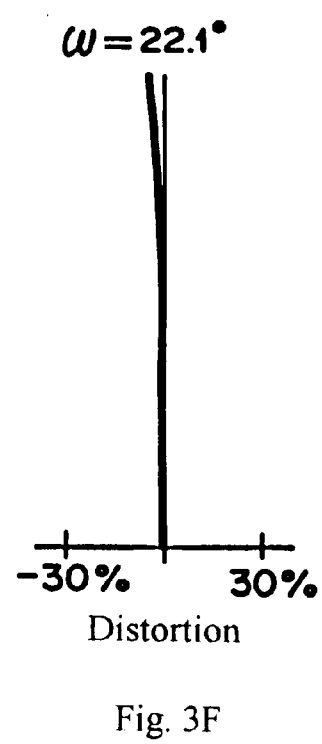

FIGS. 3A–3C show the spherical aberration, astigmatism, and distortion, respectively, of the zoom lens of Embodiment 2 at the wide-angle end. FIGS. 3D–3F show the spherical aberration, astigmatism, and distortion, respectively, of the zoom lens of Embodiment 2 at the telephoto end. The astigmatic curves are shown for both the sagittal S and tangential T image planes. As is apparent from these figures, these aberrations are favorably corrected for this embodiment over the entire range of zoom.

Embodiment 3

The zoom lens of Embodiment 3 has nearly the same structure as of Embodiment 1 except that, in this embodiment, the sixth lens element $L_6$ is a positive meniscus lens with its convex surface on the image side. Thus, this embodiment is very similar in lens element configuration to that of Embodiment 2.

Table 3 lists the surface number #, in order from the object side, the radius of curvature R (in mm) of each surface, the on-axis spacing D (in mm) between surfaces, as well as the refractive index $N_d$ and the Abbe number $v_d$ (both at the d line) of each lens element of Embodiment 3. The middle portion of Table 3 lists the values D6 and D14 at both the wide-angle end (WIDE) and telephoto end (TELE). The bottom portion of Table 3 lists the range of focal length (i.e., from the wide-angle end to telephoto end), the F number $F_{NO}$, the value $D_{2G}/f_W$ of Condition (1) and the value $R_2/f_W$ of Condition (2). As is apparent from comparing these values to the above two conditions, both Condition (1) and Condition (2) are satisfied by this embodiment.

TABLE 3

| # | R | D | $N_d$ | $v_d$ |
|---|---|---|---|---|
| 1 | 31.823 | 1.00 | 1.73861 | 54.1 |
| 2 | 9.230 | 5.03 | | |
| 3 | −86.332 | 1.80 | 1.85500 | 22.2 |
| 4 | −26.924 | 0.42 | | |
| 5 | −45.018 | 1.00 | 1.84495 | 43.5 |
| 6 | 15.691 | D6 (variable) | | |
| 7 | 50.966 | 1.86 | 1.85500 | 22.2 |
| 8 | −16.436 | 3.08 | | |
| 9 | −7.821 | 5.00 | 1.85500 | 27.5 |
| 10 | 31.267 | 0.41 | | |
| 11 | −708.275 | 2.22 | 1.67877 | 57.6 |
| 12 | −11.874 | 0.10 | | |
| 13 | 26.204 | 2.84 | 1.72636 | 55.2 |
| 14 | −15.114 | D14 (variable) | | |
| 15 | ∞ (stop) | 2.00 | | |
| 16 | −9.723 | 3.58 | 1.85500 | 26.2 |
| 17 | 14.876 | 0.26 | | |
| 18 | 34.620 | 2.10 | 1.81668 | 46.3 |
| 19 | −12.930 | 0.25 | | |
| 20 | 11.470 | 2.96 | 1.75154 | 52.8 |
| 21 | −22.623 | 1.00 | | |
| 22 | ∞ | 3.30 | 1.51633 | 64.1 |
| 23 | ∞ | | | |

| | WIDE | TELE |
|---|---|---|
| D6 | 17.05 | 1.00 |
| D14 | 1.00 | 11.88 | f = 2.27–5.92   $F_{NO}$ = 1.45   $D_{2G}/f_W$ = 6.83   $R_2/f_W$ = 4.07

Figure 4A:
FIGS. 4A–4C show the spherical aberration, astigmatism in both the sagittal S and tangential T image planes, and distortion, respectively, of Embodiment 3 at the wide-angle end.
Figure 4B:
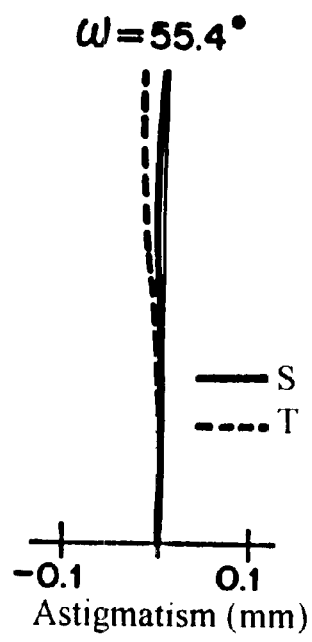
Figure 4C:
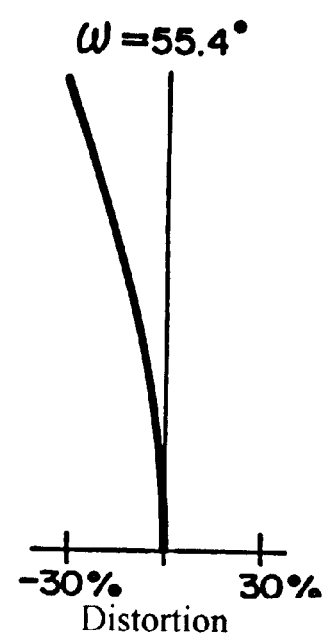
Figure 4D:
FIGS. 4D–4F show the spherical aberration, astigmatism in both the sagittal S and tangential T image planes, and distortion, respectively, of Embodiment 3 at the telephoto end.
Figure 4E:
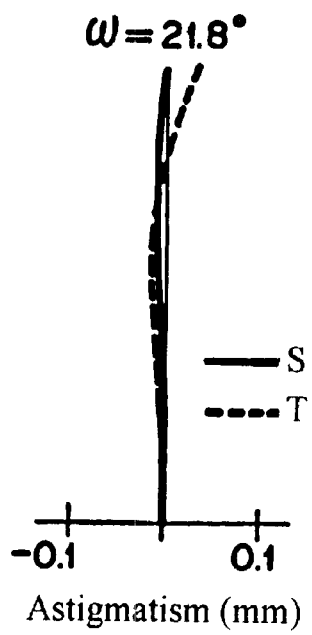
Figure 4F:

FIGS. 4A–4C show the spherical aberration, astigmatism, and distortion, respectively of the zoom lens of Embodiment 3 at the wide-angle end. FIGS. 4D–4F show the spherical aberration, astigmatism, and distortion, respectively, of the zoom lens of Embodiment 3 at the telephoto end. The astigmatic curves are shown for both the sagittal S and tangential T image planes. As is apparent from these figures, these aberrations are favorably corrected for this embodiment over the entire range of zoom.

The zoom lens of the above embodiments ensures a bright image in that the $F_{NO}$ is approximately 1.4, and the $F_{NO}$ remains constant during zooming. A wide image angle of approximately 110 degrees at the wide-angle end is provided, and the zoom ratio is approximately 2.6. Further, the present invention is a zoom lens that provides high optical performance throughout the entire range of zoom for nearby as well as distant objects.

The invention being thus described, it will be obvious that the same may be varied in many ways. For example, the number of lens elements which form each lens group can be changed, or the shape of the lens elements may be changed. Further, the dimensions R and D may be readily scaled so as to produce a zoom lens having a desired focal length. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A zoom lens having no more than three lens groups, said zoom lens formed of, in order from the object side:
    a first lens group having negative refractive power;
    a second lens group having positive refractive power, the second lens group including, in sequential order from the object side, a biconvex lens element, a negative lens element with a concave surface on the object side, a positive lens element with a convex surface on the image side, and a biconvex lens element; and
    a third lens group having positive refractive power and including a stop;
    wherein the third lens group is fixed relative to the image plane during zooming and the first and second lens groups are moved along the optical axis during zooming.

2. The zoom lens of claim 1, wherein the third lens group further includes, in order from the object side after the stop, a biconcave lens element, a biconvex lens element, and a biconvex lens element.

3. The zoom lens of claim 1, wherein the first lens group includes, in order from the object side, a negative meniscus lens element with its convex surface on the object side, a positive lens element with a convex surface on the image side, and a negative lens element with a concave surface on the image side.

4. The zoom lens of claim 2, wherein the first lens group includes, in order from the object side, a negative meniscus lens element with its convex surface on the object side, a positive lens element with a convex surface on the image side, and a negative lens element with a concave surface on the image side.

5. The zoom lens of claim 1, wherein the following condition is satisfied:

$$5.5 < D_{2G}/f_W < 7.5$$

where $D_{2G}$ is the spacing from the image side to the object side of the second lens group; and $f_W$ is the focal length of the zoom lens at the wide-angle end.

6. The zoom lens of claim 2, wherein the following condition is satisfied:

$$5.5 < D_{2G}/f_W < 7.5$$

where $D_{2G}$ is the spacing from the image side to the object side of the second lens group; and $f_W$ is the focal length of the zoom lens at the wide-angle end.

7. The zoom lens of claim 3, wherein the following condition is satisfied:

$$5.5 < D_{2G}G/f_W < 7.5$$

where $D_{2G}$ is the spacing from the image side to the object side of the second lens group; and $f_W$ is the focal length of the zoom lens at the wide-angle end.

8. The zoom lens of claim 4, wherein the following condition is satisfied:

$$5.5 < D_{2G}/f_W < 7.5$$

where $D_{2G}$ is the spacing from the image side to the object side of the second lens group; and $f_W$ is the focal length of the zoom lens at the wide-angle end.

9. The zoom lens of claim 1, wherein the following condition is satisfied:

$$3.5 < R_2/f_W < 4.7$$

where $R_2$ is the radius of curvature of the second surface, in order from the object side, and $f_W$ is the focal length of the zoom lens at the wide-angle end.

10. The zoom lens of claim 2, wherein the following condition is satisfied:

$$3.5 < R_2/f_W < 4.7$$

where $R_2$ is the radius of curvature of the second surface, in order from the object side, and $f_W$ is the focal length of the zoom lens at the wide-angle end.

11. The zoom lens of claim 3, wherein the following condition is satisfied:

$$3.5 < R_2/f_W < 4.7$$

where $R_2$ is the radius of curvature of the second surface, in order from the object side, and $f_W$ is the focal length of the zoom lens at the wide-angle end.

12. The zoom lens of claim 4, wherein the following condition is satisfied:

$$3.5 < R_2/f_W < 4.7$$

where $R_2$ is the radius of curvature of the second surface, in order from the object side, and $f_W$ is the focal length of the zoom lens at the wide-angle end.

13. The zoom lens of claim 5, wherein the following condition is satisfied:

$$3.5 < R_2/f_W < 4.7$$

where $R_2$ is the radius of curvature of the second surface, in order from the object side, and $f_W$ is the focal length of the zoom lens at the wide-angle end.

14. The zoom lens of claim 6, wherein the following condition is satisfied:

$$3.5 < R_2/f_W < 4.7$$

where $R_2$ is the radius of curvature of the second surface, in order from the object side, and $f_W$ is the focal length of the zoom lens at the wide-angle end.

15. The zoom lens of claim 7, wherein the following condition is satisfied:

$$3.5 < R_2/f_W < 4.7$$

where $R_2$ is the radius of curvature of the second surface, in order from the object side, and $f_W$ is the focal length of the zoom lens at the wide-angle end.

16. The zoom lens of claim 8, wherein the following condition is satisfied:

$$3.5 < R_2/f_W < 4.7$$

where $R_2$ is the radius of curvature of the second surface, in order from the object side, and $f_W$ is the focal length of the zoom lens at the wide-angle end.

* * * * *

UNITED STATES PATENT AND TRADEMARK OFFICE
CERTIFICATE OF CORRECTION

PATENT NO. : 6,392,815 B2
DATED : May 21, 2002
INVENTOR(S) : Toyama

It is certified that error appears in the above-identified patent and that said Letters Patent is hereby corrected as shown below:

<u>Title page,</u>
Item [75], change the inventor's residence from "Omiya (JP)" to -- Saitama (JP) --
Item [74], *Attorney, Agent, or Firm,* change the name of the Primary Examiner from: "Evelyn A Lester" to -- Evelyn A. Lester --

Signed and Sealed this

Third Day of December, 2002

JAMES E. ROGAN
*Director of the United States Patent and Trademark Office*